Aug. 6, 1940.  R. T. CLOUD  2,210,795

METHOD AND APPARATUS FOR ELECTRICAL LOGGING

Filed Feb. 16, 1939  3 Sheets-Sheet 1

INVENTOR
Raymond T. Cloud
BY Clarence H. Seeley
ATTORNEY

Aug. 6, 1940.      R. T. CLOUD      2,210,795
METHOD AND APPARATUS FOR ELECTRICAL LOGGING
Filed Feb. 16, 1939      3 Sheets-Sheet 2

INVENTOR
Raymond T. Cloud
BY Clarence H. Seeley
ATTORNEY

Patented Aug. 6, 1940

2,210,795

UNITED STATES PATENT OFFICE 2,210,795

METHOD AND APPARATUS FOR ELECTRICAL LOGGING

Raymond T. Cloud, Tulsa, Okla., assignor to Stanolind Oil and Gas Company, Tulsa, Okla., a corporation of Delaware Application February 16, 1939, Serial No. 256,739

17 Claims. (Cl. 175—182)

This invention relates to the electrical logging of earth formations and more particularly to methods and apparatus for making a record of the various strata traversed by a well or bore hole.

A number of methods of logging wells electrically are known to the art and among them are those which distinguish porous from non-porous strata by means of variations in natural potential and those which measure the specific resistivities of the various formations or some function thereof. The use of both types of electrical logging on the same well is extremely desirable in order that oil- and water-bearing strata can de distinguished and their locations determined, since neither alone will give sufficient information. For example, a stratum of shale has about the same specific resistivity as a water-bearing sandstone so that the location of the latter cannot be determined by a resistivity method, while on the other hand porous strata containing water cannot be distinguished from those containing oil by natural potential methods.

Porous strata have heretofore been located by lowering an electrode down the well and measuring the natural potential difference between this electrode and another at the surface or by lowering two vertically spaced electrodes and measuring the natural potential gradient across them. The source of the natural potentials measured is not entirely understood, the principal theories being that they are due to the motion of the liquids through the capillary interstices of the porous structure or to electro-chemical action in the earth. The fact remains, however, that natural potentials do exist and are of relatively great magnitude in more porous formations.

The measurement of the resistivity of the various formations adjacent a well bore is generally carried out by a similar procedure except that the potential difference measured is that induced by a current applied to the earth between an electrode located in the well and spaced a fixed distance from the other electrode or electrodes therein and a point at the surface of the earth. The theory underlying such resistivity methods is well-known and will not be discussed here.

It is well recognized that the boundaries between the various types of strata in a well should be located within relatively close limits since such information is required, for example to seal off water from entering the well, while permitting the entry of oil. Known procedures often fail to define the boundaries between different strata with sufficient exactness to insure that the well will be properly completed.

One object of my invention to provide a method and apparatus by which an extremely clear indication is obtained of the location of the boundaries between the various strata traversed by a well and which is applicable to both the natural potential and resistivity methods of electrical logging. Another object is to provide a novel system for utilizing rates of change rather than absolute values of the electrical variations obtained by known logging procedures whereby easily interpreted logs are obtained. Further objects and advantages of my invention will be apparent from the following description thereof read in connection with the drawings in which:

Figure 1:
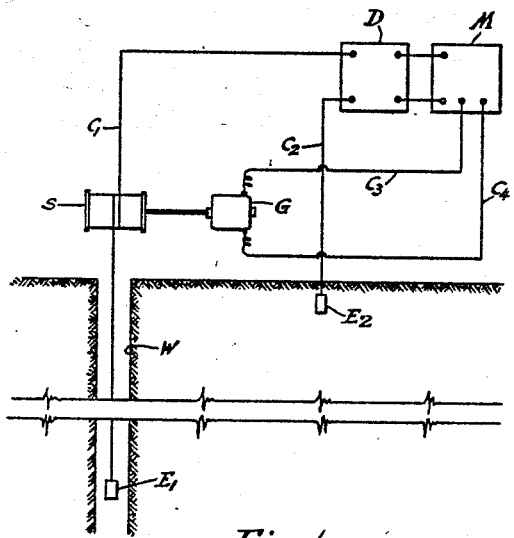
Figures 1 and 2 show schematically forms of apparatus for obtaining porosity logs according to my invention.

In one of its broadest aspects my invention comprises measuring the rate of change with depth of electrical effects indicative of the nature of the various formations traversed by a well. Generally, this is best carried out by continuously changing the level of at least one electrode in the well while obtaining the potential difference between the well electrode and a reference electrode in electrical contact with the earth, impressing this potential difference or electrical effects proportional thereto upon a derivator, i. e. a circuit or other means adapted to produce therefrom electrical variations substantially proportional to the rate of change of the applied potential difference with respect to time, simultaneously generating an electric current having a value substantially proportional to the velocity at which the level of the well electrode is changed and measuring the ratio between the electrical variations and the electric current by means of a suitable instrument, such as a ratio type galvanometer.

Since the rate of change of the potential difference between the electrodes with respect to time at each instant, can be expressed as $$\frac{de}{dt}$$

and the velocity at which the level of the well electrode is changing as $$\frac{ds}{dt}$$

where $s$ is linear distance and in this case depth, the resultant motion of the ratio type galvanometer will be a measure of $$\frac{de}{dt}\bigg/\frac{ds}{dt}$$

which is equal to $$\frac{de}{ds}$$

The expression $$\frac{de}{ds}$$

means merely the rate of change of the potential difference between the electrodes with depth at each instant and will obviously have a positive value when this potential difference increases, i. e., is becoming less negative or more positive, and a negative value when it decreases. The greatest deflections will be obtained when the properties of the strata traversed change most rapidly and this will be at the interfaces between them, so that exceptionally clear indications of the locations of the porous and/or relatively high-resistance strata are obtained.

While the method of utilizing rates of change with depth as described above is preferred because the readings are not influenced by variations in the velocity of the electrodes, a sufficiently accurate log of the same type can be made in many cases by using a substantially constant electrode velocity, and directly measuring or recording the rate of change of potential difference with time at various depths.

The derivator used to convert variations in potential to the rate of change of potential difference with time can be of any suitable type, and examples of two types will be given in connection with the description of Figures 5 and 6. In some cases it may be possible to use a ratio meter of the indicating type, but the deflections are usually so rapid that a recording type meter is necessary. In any case a recording meter is preferred, since logs of the ratio meter deflections versus depth can then be made in the customary manner.

As stated above my invention is applicable particularly to natural potential and resistivity logging but is not limited thereto. The well to be logged must of course be free from casing at the levels being explored so that there will be no extraneous influence on the potentials being measured and it is also preferably filled with a fluid such as water or drilling mud so that the electrode or electrodes will be in electrical contact with the adjacent formations, although under some conditions electrodes making mechanical contact with the well walls can be used.

My invention also includes a number of other features and these will be brought out as the description proceeds. Referring now to the drawings, Figure 1 shows schematically the essential apparatus for practicing my invention as applied to the form of electrical logging in which porous strata are located by lowering one electrode into the well and measuring the potential difference between that electrode and another grounded at the surface at various levels of the well electrode. Electrode $E_1$ is lowered into well W by means of electrical conductor $C_1$ which passes over measuring spool S. Ordinarily of course $C_1$ will consist of an insulated cable supported by and wound on a drum, but these details are not shown for purposes of simplicity. A second electrode $E_2$ is grounded at the surface of the earth and connected to derivator D by means of conductor $C_2$ and conductor $C_1$ is also connected to the input side of derivator D so that the input to the latter is the natural potential between electrodes $E_1$ and $E_2$, which varies in a well-known manner as electrode $E_1$ is raised or lowered past various types of strata. Derivator D is such that its output voltage is substantially proportional to the rate of change of the input potential with respect to time and will be described further and in more detail in connection with Figure 5. The output from derivator D is then applied to one coil of ratio meter M which consists essentially of two coils at a fixed angle to each other rotatably mounted in a magnetic field. Measuring spool S is utilized to operate a direct current generator G having an output substantially proportional to the velocity at which electrode $E_1$ is raised or lowered and this output current is applied to the other coil of ratio meter M by means of conductors $C_3$ and $C_4$.

The deflection of ratio meter M will be substantially proportional to the rate of change of natural potential down the well with depth as hereinabove described and will have a maximum value when electrode $E_1$ passes the interface between a porous and non-porous formation. Meter M will also indicate whether electrode $E_1$ is passing the upper or lower interface of a porous formation because the deflection will be positive when the natural potential increases and negative when it decreases.

Figure 2:
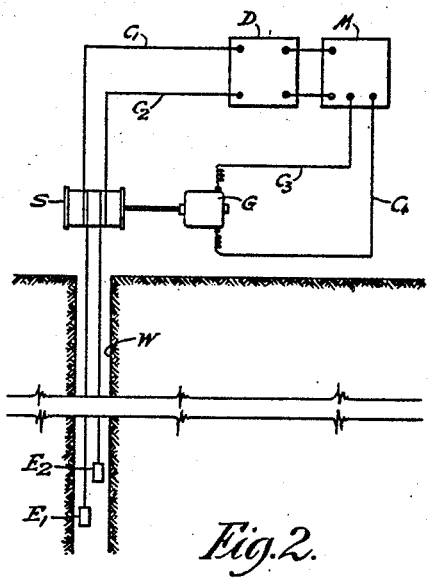

Figure 2 shows the modification in which electrode $E_2$ is also lowered into well W and conductor $C_2$ also passes over measuring spool S. The principle of operation in this case is exactly the same but the readings will be slightly different due to the fact that the potential of electrode $E_2$ is not constant. The difference between the records obtained by these forms of my invention will be discussed further in connection with Figure 7.

Figure 3:
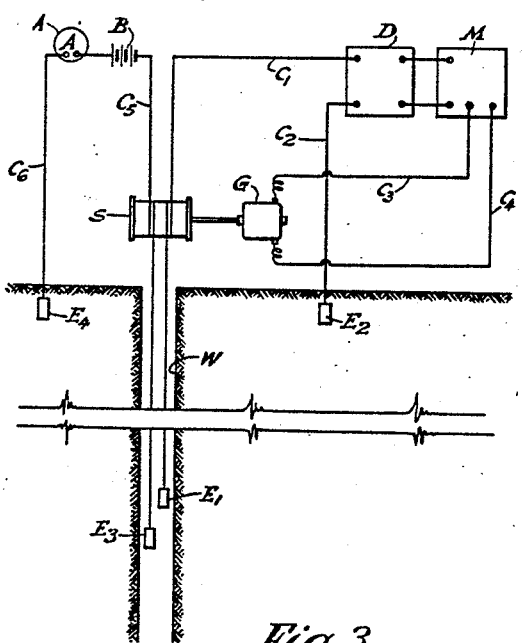
Figures 3 and 4 show schematically forms of apparatus for obtaining resistivity logs according to my invention.

As stated above my invention is equally applicable to resistivity logging and apparatus according to my invention for this purpose is illustrated in Figure 3. This figure is very similar to Figure 1 with the addition of a circuit for passing an electric current between a point in the well and a point at the surface of the earth. As shown the added elements consist of electrode $E_3$, which is vertically spaced a short distance, for example 1 to 5 feet, below electrode $E_1$, connected by means of conductor $C_5$, which also passes over measuring spool S, to a source of direct current, such as battery B, the circuit being completed by ammeter A, conductor $C_6$, grounded electrode $E_4$ and the earth. In operation the electrode array consisting of electrodes $E_1$ and $E_3$ is lowered into the well and an electric current passed between electrodes $E_3$ and $E_4$. The potential difference between electrodes $E_1$ and $E_2$, which is a function of the specific resistivity of the formation in the vicinity of electrode $E_1$, is applied to derivator D as in Figure 1 and the deflection of meter M is in this case also substantially proportional to the rate of change of the potential difference between electrodes $E_1$ and $E_2$ with depth. Obviously therefore, the interfaces between strata of various resistivities are clearly marked and the direction of deflection of meter M indicates whether electrode $E_1$ is entering a zone of higher or lower resistivity.

Figure 4:
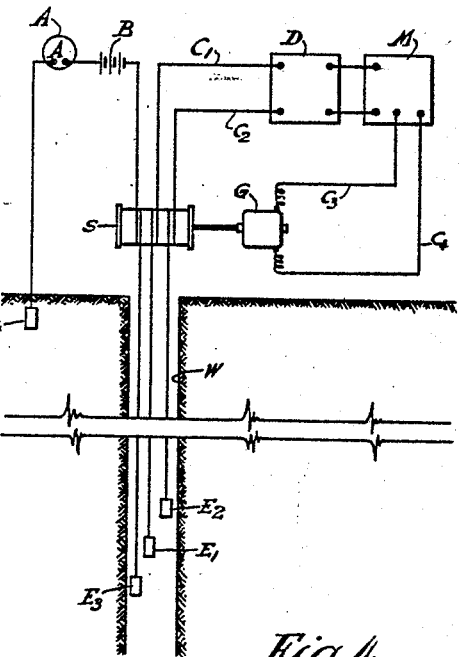

Figure 4 is similar to Figure 3 with the exception that the electrode $E_2$ instead of being grounded at the surface is made a part of the electrode array, the operation thereof being the same.

Figure 5:
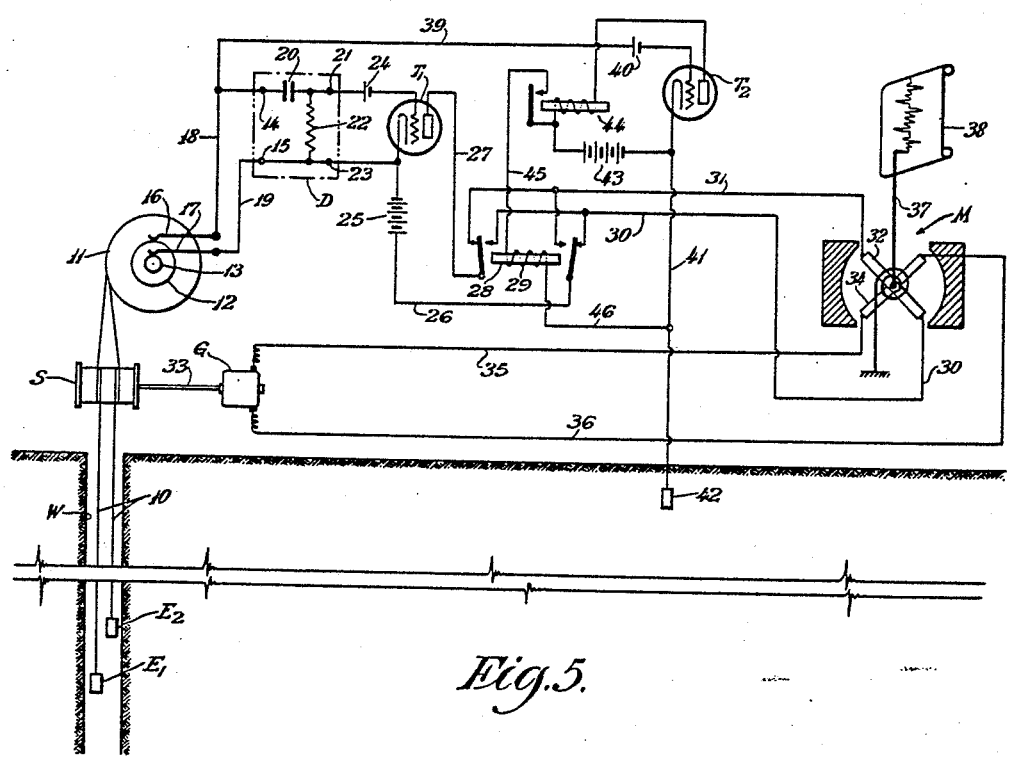
Figure 5 shows an apparatus similar to that of Figure 2 but including a stage of amplification and an automatic polarity changing circuit as well as other details.

Referring now to Figure 5, a preferred form my invention is shown which is a more detailed modification of the apparatus of Figure 2. Usually the natural potentials down a well are all of the same polarity with reference to a fixed point at the surface. However, in some cases there is a reversal of potential at one or more points down the well and false records will be obtained showing the indicated location of the porous and non-porous structures reversed unless these points of reversal are found. I have devised a mechanism for compensating for these points of reversal automatically and have included an example of this mechanism in Figure 5. One stage of amplification is also included since the natural potentials encountered are occasionally very small and may be insufficient to operate the relatively rugged type of meters suitable for field use. An array of electrodes consisting of electrodes $E_1$ and $E_2$ which are preferably vertically spaced is shown which is adapted to be lowered into well W by means of insulated cable 10 containing two independent electrical conductors connected to the electrodes. Cable 10 passes over measuring spool S and is wound on drum 11 which is operated by well-known means (not shown) so that the electrode array can be raised and lowered at will. The electrical conductors in cable 10 are connected to slip rings 12 and 13 attached to drum 11 so that they carry the potentials of electrodes 1 and 2, respectively. These potentials are impressed upon input terminals 14 and 15 of derivator D by means of brushes 16 and 17 and lines 18 and 19 respectively.

Derivator D is shown by way of example as a condenser 20 inserted between input terminal 14 and output terminal 21 and a resistance 22 connected across output terminals 21 and 24, input terminal 15 being connected to output terminal 23. When the values of condenser 20 and resistance 22 are properly chosen the voltage across output terminals 21 and 23 varies substantially as the derivative with respect to time of the input voltage. In other words, the output voltage has a value at each instant approximately proportional to the rate of change of the input voltage with respect to time. The electrical differentiation has been found to be sufficiently accurate by using a condenser 20 having a capacitance of about 0.003 microfarad and a resistance 22 equal to about 10,000 ohms. The potential difference across terminals 21 and 23 is applied to the grid circuit of a vacuum tube $T_1$ having a bias battery 24 and is thereby amplified so that the current flowing in the plate circuit is of a relatively large magnitude but still proportional to the grid voltage. The current in the plate circuit passes through battery 25 and lines 26 and 27 to a pole-reversing relay 28 having an energizing coil 29 and contacts normally urged in the position shown, and thence by means of lines 30 and 31 to coil 32 of a ratio type galvanometer M.

Measuring spool S is arranged to drive a small direct current generator having an output proportional to its speed of rotation by means of a suitable mechanism such as flexible shaft 33. The output of generator G is therefore obviously proportional to the velocity at which the level of the electrode array is changed within the well and is applied across the other coil 34 of ratio meter M by means of conductors 35 and 36. Ratio meter M is of a type such that its moving part will be deflected in a manner which is a function of the ratio between the currents passing through coils 32 and 34 at any given time and that deflection would therefore be in this case an indication of the rate of change of the potential difference between the electrodes $E_1$ and $E_2$ divided by the velocity at which these electrodes are moved or, in other words, the rate of change of this potential difference per unit of distance down the well. It is desirable to use a ratio meter of the recording type and ratio meter M is therefore shown with a pen arm 37 adapted to make a continuous record on recording strip 38 which can be moved at a rate proportional to the rate at which the electrode array is raised or lowered in the well in the usual manner. Obviously other types of recording mechanisms can also be used.

In order to insure against false readings due to polarity changes with respect to a point on the surface of the earth the potential from one of the well electrodes, in this case electrode $E_1$, is applied to the grid of a vacuum tube $T_2$ by means of line 39 which connects with line 18 and also contains a grid bias battery 40, the filament of tube $T_2$ being grounded by means of conductor 41 leading to an electrode 42 in electrical contact with the earth. The electromotive force of battery 40 is chosen so that tube $T_2$ is biased to the cut-off point when the potential difference between electrodes $E_1$ and 42 is zero. Therefore, as long as electrode $E_1$ has a zero or negative potential with respect to electrode 42 no current will flow in the plate circuit of tube $T_2$ and relay 28 will remain in the position shown. When the potential of electrode $E_1$ is positive, however, current from battery 43 will flow in the plate circuit and will close sensitive relay 44 which will in turn allow current from battery 43 to flow through lines 45 and 46 and energize coil 29 thus reversing the polarity of coil 32 of meter M.

It is readily apparent from the above that uniform readings down the well indicative of the location of the porous strata traversed thereby will be obtained and particularly that the interfaces bounding such porous strata will be well marked. Obviously the same type of circuit described above can be readily applied to other forms of apparatus embodying my invention. Specifically the apparatus of Figure 5 can be converted to a form based on that shown in Figure 1 by omitting electrode $E_2$ and connecting electrode 42 to input terminal 15 by derivator D. Furthermore other types of differentiating means can be used, and a particularly suitable one is a transformer placed in the circuit between the exploring electrodes and ratio meter M.

Figure 6:
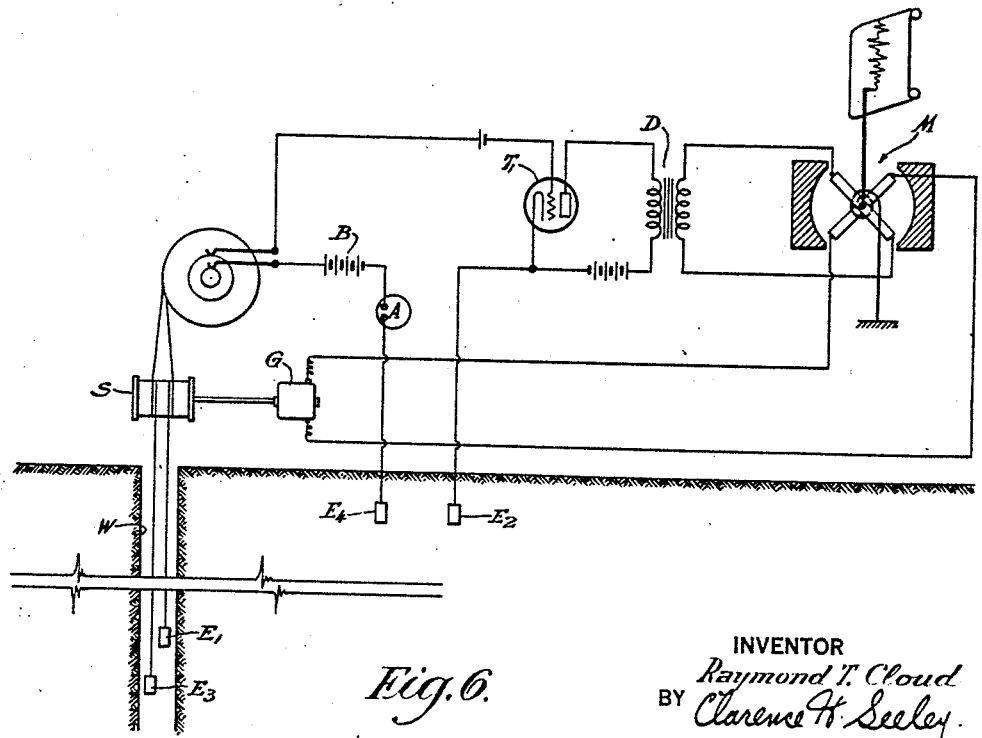
Figure 6 shows in greater detail an apparatus similar to that of Figure 3.

Figure 6 illustrates in greater detail apparatus for logging wells similar in principle to that of Figure 3 and utilizing the transformer type of derivator. Since the elements shown perform the same functions as the corresponding elements of Figure 5, it is deemed unnecessary to describe them fully and it will be sufficient to say that an electric current is supplied by battery B is passed between electrodes E₃ and E₄ and the potential difference between electrodes E₁ and E₂ induced by this current is amplified by means of tube T₁ and the amplified current is supplied to the primary coil of derivator D, which in this case is a transformer. As is well-known, the voltage across the secondary winding of a transformer is substantial proportional to the rate of change of the current in the primary with respect to time. In this case therefore, the voltage across the secondary winding is proportional to $$\frac{de}{dt}$$

where $e$ is the potential difference between electrodes E₁ and E₂, and the resulting current is applied to one coil of ratio meter M. Likewise, a current substantially proportional to the velocity with which the electrode array is raised or lowered within the well is supplied to the other coil of ratio M and a record of the ratio between these electric currents is recorded. Since the potential difference between electrodes E₁ and E₂ varies as the resistivity of the formation in the vicinity of electrode E₁, the record obtained will show the greatest deflection when electrode E₁ is passing an interface between formations having different resistivities.

Figure 7:
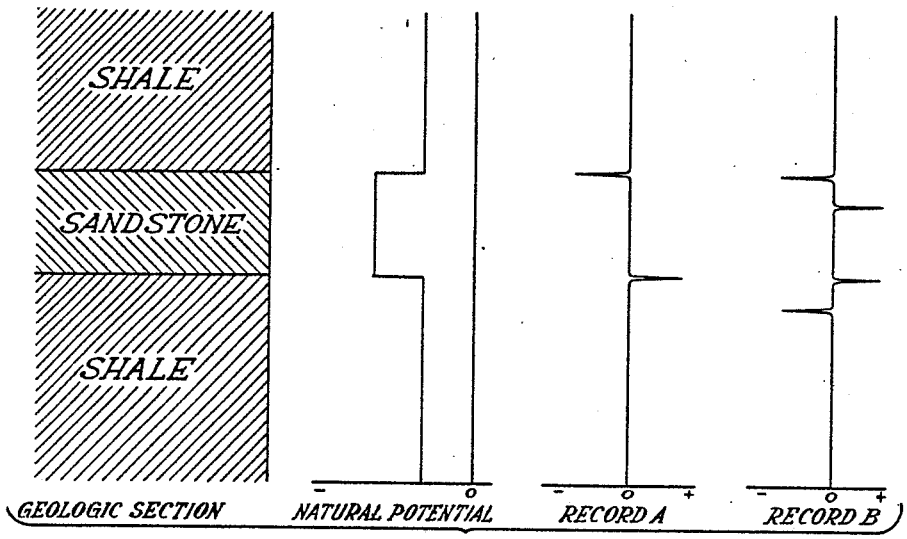
Figure 7 illustrates idealized records of the type obtainable by utilizing the apparatus of Figures 1 and 2.
Figure 8:
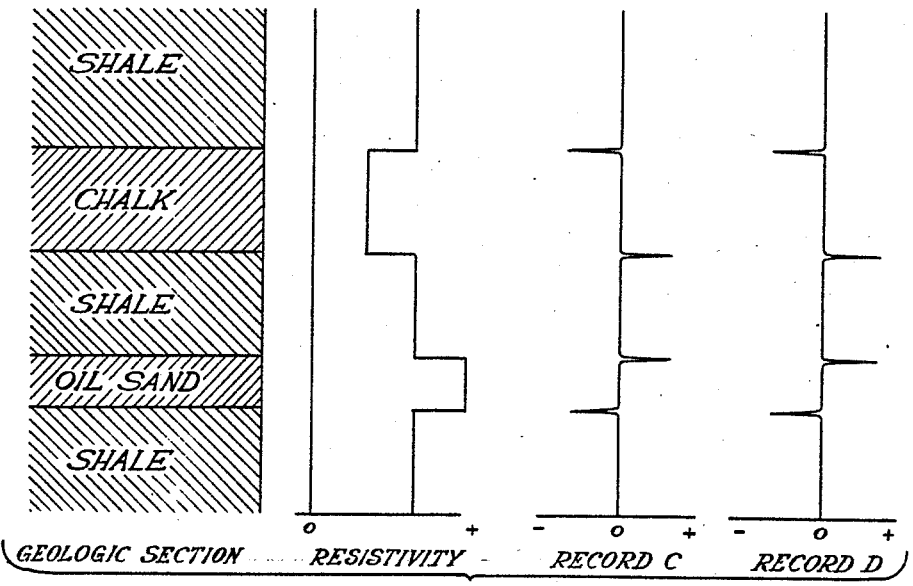
Figure 8 illustrates idealized records of the type obtainable by utilizing the apparatus of Figures 3 and 4.

Examples of some types of records obtained according to my invention are shown in idealized form in Figures 7 and 8. In the first column of Figure 7 a typical geologic section is shown with a layer of porous sandstone between strata of relatively impervious shale, and in the second column a graph is shown which represents the natural potential in this geologic section with respect to a fixed point at the surface of the earth. It is, of course, recognized that natural potentials are not as constant for a given stratum and that the changes at the boundaries of porous strata are not as abrupt as shown, but this graph will be satisfactory for purposes of illustration. The next column noted as record A represents the type of record obtainable for this geologic section using the apparatus of Figure 1. Obviously when electrode E₁ passes the interface the potential difference between that electrode and electrode E₂ at the surface will become more negative and meter M will show a deflection in the negative direction. Likewise, when electrode E₁ passes the lower interface the potential difference will become less negative and the meter deflection will be in the positive direction. It is thus seen that the boundaries of the porous formation are very clearly marked. Record B which would be obtained using the apparatus of Figure 2 is quite similar and equally clear but in this case the negative deflection is obtained when electrode E₁ passes the upper interface and a corresponding positive deflection obtained when the upper electrode E₂ passes the same interface, the reason for this being of course that as electrode E₂ becomes more negative the potential difference between electrodes E₁ and E₂ increases to a value approaching zero. Likewise, similar deflections are obtained as the electrodes pass the lower interface except that they are, of course, in the opposite direction.

The type of records obtainable by applying my invention to electrical logging of the resistivity type is shown in Figure 8. Here also the first column shows a typical geologic section and the adjacent graph shows the specific resistivities of the various formations, that having the highest resistivity being shown as an oil sand. With the apparatus of Figure 3 a record similar to that illustrated as record C will be obtained since the potential difference between electrodes E₁ and E₂ will decrease as electrode E₁ approaches a less resistant formation and will increase when it approaches a formation which has a higher specific resistivity. The explanation of the deflections themselves is exactly the same as already set forth in connection with Figure 7. Record D which would be obtained with the apparatus of Figure 4 is similar to record C for the same reasons.

Many details have been omitted for the sake of simplicity but these can be readily supplied by those skilled in the art. For example the complete filament circuits of the various tubes are not shown nor are certain switches, resistances, etc. which would be included in any practical logging apparatus. Obviously the vacuum tubes used should be such that the variations in plate current would be substantially linear with respect to variations in grid voltage over the range in which they are operated.

While I have described my invention in connection with certain specific embodiments thereof, I do not desire to be limited thereto but only by the following claims in which I have defined my invention.

I claim:

1. The method of logging earth formations traversed by a well which comprises producing a direct electric current responsive to the potential difference existing between a moving point in said well and a point in electrical contact with the earth, producing electrical variations having amplitudes responsive to the rate of change of said electric current with respect to time, and measuring a function of said electrical variations.

2. The method of logging earth formations traversed by a well which comprises producing a direct electric current responsive to the potential difference existing between a moving point in said well and a point in electrical contact with the earth, producing electrical variations having amplitudes responsive to the rate of change of said electric current with respect to time, and measuring a function of the ratio of said electrical variations to the velocity of said moving point.

3. The method of logging earth formations traversed by a well which comprises producing electrical effects indicative of the nature of said formations at a continuously changing level in said well, producing electrical variations responsive to the rate of change of said electrical effects with respect to time, generating an electric current proportional to the rate at which said level changes, and measuring the ratio of said electrical variations to said electric current.

4. The method of logging earth formations traversed by a well which comprises continuously changing the level of at least one electrode in said well, producing electrical effects indicative of the nature of said formations in the vicinity of said electrode, producing electrical variations responsive to the rate of change of said electrical effects with respect to time, simultaneously generating an electric current proportional to the rate at which the level of said electrode is changed, and recording the ratio of said electrical variations to said electric current as a function of the level of said electrode.

5. The method of logging earth formations traversed by a well which comprises producing an electric current responsive to the natural potential difference existing between a moving point in said well and a point in electrical contact with the earth, producing electrical variations having amplitudes responsive to the rate of change of said electric current with respect to time, and measuring a function of said electrical variations.

6. The method of logging earth formations traversed by a well which comprises producing an electric current responsive to the natural potential difference existing between a moving point in said well and a point in electrical contact with the earth, producing electrical variations having amplitudes responsive to the rate of change of said electric current with respect to time, and measuring of function of the ratio of said electrical variations to the velocity of said moving point.

7. The method of logging earth formations traversed by a well which comprises producing electrical effects responsive to the natural potential difference between a continuously moving point within said well and a reference point in electrical contact with the earth, producing electrical variations responsive to the rate of change of said electrical effects with respect to time, simultaneously generating an electric current substantially proportional to the velocity of said moving point, and recording the ratio of said electrical variations to said electric current.

8. The method of logging earth formations traversed by a well which comprises passing a direct electric current through the earth between a first moving point in said well and a point in electrical contact with the earth, producing a second electric current responsive to the potential difference existing between a second moving point within said well vertically spaced from said first moving point and a reference point in electrical contact with the earth, producing electrical variations having amplitudes responsive to the rate of change of said second electric current with respect to time, and measuring a function of said electrical variations.

9. The method of logging earth formations traversed by a well which comprises passing a direct electric current through the earth between a first moving point in said well and a point in electrical contact with the earth, producing a second electric current responsive to the potential difference existing between a second moving point within said well vertically spaced from said first moving point and a reference point in electrical contact with the earth, producing electrical variations having amplitudes responsive to the rate of change of said second electric current with respect to time, and measuring a function of the ratio of said electrical variations to the velocity of said moving points.

10. The method of logging earth formations traversed by a well which comprises passing an electric current through the earth between a continuously moving point in said well and a point on the surface of the earth, producing electrical effects responsive to the potential difference between a second point within said well vertically spaced from said continuously moving point and a reference point in electrical contact with the earth, producing electrical variations responsive to the rate of change of said electrical effects with respect to time, simultaneously generating a second electric current substantially proportional to the velocity of said moving point, and recording the ratio of said electrical variations to said second electric current.

11. Apparatus for logging earth formations traversed by a well comprising at least one electrode adapted to be lowered into said well, means for changing the level of said electrode within said well, a reference electrode adapted to be placed in electrical contact with the earth, means for producing a direct electric current responsive to the potential difference between said electrodes, means for producing electrical variations having amplitudes responsive to the rate of change of said electric current with respect to time, and means for measuring a function of said electrical variations.

12. Apparatus for logging earth formations traversed by a well comprising at least one electrode adapted to be lowered into said well, means for changing the level of said electrode within said well, a reference electrode adapted to be placed in electrical contact with the earth, means for producing a direct electric current responsive to the potential difference between said electrodes, means for producing electrical variations having amplitudes responsive to the rate of change of said electric current with respect to time, and means for measuring a function of the ratio of said electrical variations to the velocity of said first-mentioned electrode.

13. Apparatus for logging earth formations traversed by a well comprising at least one electrode adapted to be lowered into said well, means for changing the level of said electrode within said well, means for producing electrical effects indicative of the nature of said formations in the vicinity of said electrode, means for producing an electric current varying in a manner substantially proportional to the rate of change of said electrical effects with respect to time, means for generating a second electric current substantially proportional to the velocity of said electrode and means for measuring and recording the ratio of said electric currents.

14. Apparatus for logging earth formations traversed by a well comprising at least one electrode adapted to be lowered into said well, means for changing the level of said electrode within said well, a reference electrode adapted to be placed in electrical contact with the earth, means for producing an electric current varying in a manner substantially proportional to the derivative of the potential difference between said electrodes with respect to time, a ratio type galvanometer, means for passing said electric current through one coil of said galvanometer, means for generating a second electric current substantially proportional to the velocity of said first mentioned electrode within said well, means for passing said second electric current through the other coil of said galvanometer, and means for recording the deflections of said galvanometer.

15. Apparatus for logging earth formations according to claim 14 wherein said reference electrode is also adapted to be lowered into said well and maintained in a fixed vertically spaced position with respect to said first-mentioned electrode.

16. Apparatus for logging earth formations according to claim 14 including a third electrode adapted to be lowered into said well and maintained in a fixed vertically spaced position with respect to said first-mentioned electrode, a fourth electrode adapted to be grounded at the surface of the earth, and means for passing an electric current between said third and fourth electrode.

17. Apparatus for logging earth formations according to claim 14 including means for reversing the direction of flow of said first-mentioned electric current through said first-mentioned coil of said galvanometer when the polarity of said first-mentioned electrode changes with respect to a fixed point at the surface of the earth.

RAYMOND T. CLOUD.